(12) United States Patent
Filsfils et al.

(10) Patent No.: US 12,341,679 B2
(45) Date of Patent: Jun. 24, 2025

(54) PATH ASSURANCE IN SHARED TRANSPORT

(71) Applicant: Cisco Technology, Inc., San Jose, CA (US)

(72) Inventors: Clarence Filsfils, Brussels (BE); Pablo Camarillo Garvia, Madrid (ES); Ahmed Mohamed Ahmed Abdelsalam, L'Aquila (IT); Karen Michele Cadora, Boulder, CO (US)

(73) Assignee: Cisco Technology, Inc., San Jose, CA (US)

(*) Notice: Subject to any disclaimer, the term of this patent is extended or adjusted under 35 U.S.C. 154(b) by 442 days.

(21) Appl. No.: 17/727,428

(22) Filed: Apr. 22, 2022

(65) Prior Publication Data

US 2023/0009602 A1    Jan. 12, 2023

Related U.S. Application Data

(60) Provisional application No. 63/220,963, filed on Jul. 12, 2021.

(51) Int. Cl.
  *H04L 1/00*    (2006.01)
  *H04L 43/12*   (2022.01)
  *H04L 45/02*   (2022.01)

(52) U.S. Cl.
  CPC .............. *H04L 43/12* (2013.01); *H04L 45/02* (2013.01)

(58) Field of Classification Search
  CPC ......... H04L 43/12; H04L 45/02; H04L 43/10; H04L 45/24; H04L 45/26; H04L 45/38; H04L 45/70; H04L 41/142; H04L 41/5009; H04L 43/0835; H04L 43/0858; H04L 43/087; H04L 43/0876; H04L 41/12; H04L 41/5019; H04L 43/06; H04L 43/08; H04L 43/50
  See application file for complete search history.

(56) References Cited

U.S. PATENT DOCUMENTS

| | | | |
|---|---|---|---|
| 8,670,326 B1 | 3/2014 | Balasubramanian et al. | |
| 11,057,307 B1 | 7/2021 | Matthews et al. | |
| 11,876,715 B2 * | 1/2024 | Yuan | H04L 43/10 |

(Continued)

OTHER PUBLICATIONS

International Search Report and Written Opinion for PCT Application No. PCT/US2022/036714, issued on Sep. 28, 2022, 12 pages.

*Primary Examiner* — Edan Orgad
*Assistant Examiner* — Hidayat Dabiri
(74) *Attorney, Agent, or Firm* — Polsinelli P.C.

(57) ABSTRACT

Disclosed are systems, apparatuses, methods, and computer-readable media to measure performance of distinct paths of a network. A method includes determining a collection of hashes of a network based on a network probe event, each hash in the collection of hashes corresponding to a distinct path from a first edge device to a second edge device through the network; transmitting a collection of probes from the first edge device in the network, wherein each probe in the collection of probes is assigned a hash selected from the collection of hashes; receiving probes from the collection of probes at the second edge device; and determining a network performance of each distinct path through the network.

20 Claims, 8 Drawing Sheets

(56) References Cited

U.S. PATENT DOCUMENTS

| | | |
|---|---|---|
| 2004/0125797 A1* | 7/2004 | Raisanen ............... H04L 45/38 |
| | | 370/392 |
| 2008/0170550 A1* | 7/2008 | Liu ...................... H04L 49/602 |
| | | 370/338 |
| 2010/0008251 A1* | 1/2010 | Bender ................ H04L 1/0057 |
| | | 370/252 |
| 2012/0106339 A1 | 5/2012 | Mishra et al. |
| 2015/0127797 A1* | 5/2015 | Attar ...................... H04L 45/38 |
| | | 709/223 |
| 2015/0207824 A1* | 7/2015 | Sathish .............. H04L 67/1097 |
| | | 709/219 |
| 2016/0164741 A1 | 6/2016 | Durgin et al. |
| 2017/0093718 A1* | 3/2017 | Lin ........................ H04L 47/34 |
| 2019/0173736 A1 | 6/2019 | Ponnuswamy et al. |
| 2019/0260670 A1* | 8/2019 | Kulkarni ............... H04L 45/023 |
| 2020/0084147 A1 | 3/2020 | Gandhi et al. |
| 2021/0029041 A1* | 1/2021 | Yuan ..................... H04L 43/10 |
| 2021/0036946 A1* | 2/2021 | Parimi ................... H04L 45/20 |
| 2021/0111989 A1 | 4/2021 | Nainar et al. |
| 2021/0111992 A1 | 4/2021 | Nainar et al. |
| 2021/0400029 A1* | 12/2021 | Wang ................. H04L 63/0485 |

* cited by examiner

PATH ASSURANCE IN SHARED TRANSPORT

CROSS-REFERENCE TO RELATED APPLICATIONS

This application claims priority to U.S. Provisional Patent Application No. 63/220,963, filed on Jul. 12, 2021, the content of which is incorporated herein by reference in its entirety.

BACKGROUND

Equal Cost Multi-Path (ECMP) is often used in a network for efficient load balancing and network resiliency. In an ECMP network environment, path selection may be made by a transit node based on a local hashing mechanism that considers various key values from the packet header (such as Internet Protocol (IP) header information, Internet Protocol version 6 (IPv6) flow label, IPv6 Source Address, IPv6 Destination Address, etc.) and local variables (incoming interface identifier, loopback address, etc.). Depending on the network design and deployment model, the number of ECMP paths between endpoints may vary between two to several hundreds or even thousands.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
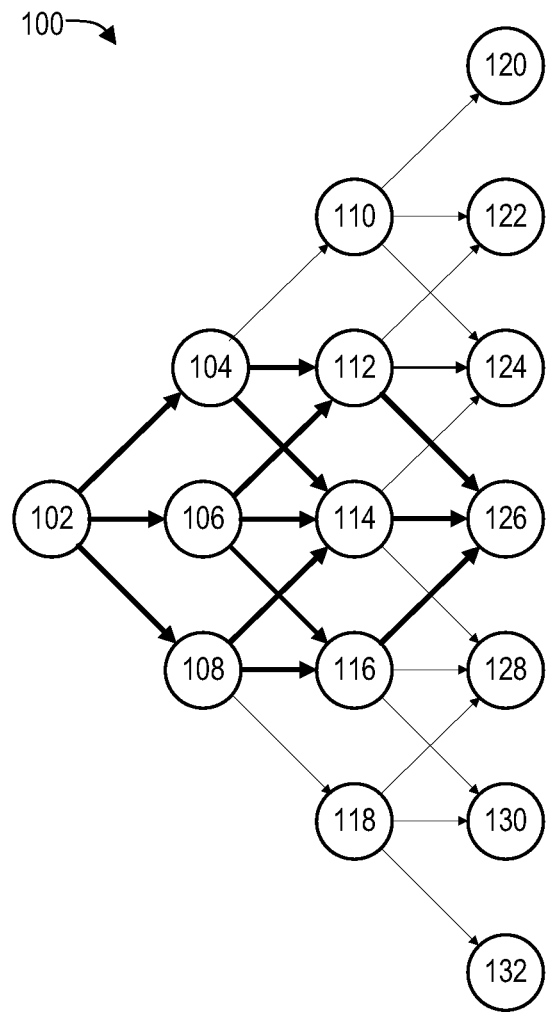
FIG. 1 illustrates a conventional approach to monitoring network paths in an equal cost multipath (ECMP) network.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods, and computer-readable media are disclosed for configuring circuit connections in segment routing (SR) networks. In some examples, circuit connections provide end-to-end circuit-style segment routing traffic engineering (SRTE) as an IP transport technology. In some cases, the end-to-end circuit-style SRTE can mimic time division multiplexing (TDM)/optical behavior and service level agreements (SLA) by controlling bandwidth (BW) reservation and utilization end-to-end based on path computation element (PCE) (e.g., CrossWorks optimization engine or COE) and SRTE (XR) foundations. The circuit-style connections can utilize co-routed bidirectional network connections that are maintained and monitored to ensure that the qualities of a circuit connection can be guaranteed.

Disclosed are systems, apparatuses, methods, and computer-readable media for monitoring each distinct path in the network. According to at least one example, a method is provided for monitoring each distinct path in the network. The method includes: determining a collection of hashes of a network based on a network probe event, each hash in the collection of hashes corresponding to a distinct path from a first edge device to a second edge device through the network; transmitting a collection of probes from the first edge device in the network, wherein each probe in the collection of probes is assigned a hash selected from the collection of hashes; receiving probes from the collection of probes at the second edge device; and analyzing each probe received by the second edge device and determining a network performance of each distinct path through the network.

In another example, an apparatus for monitoring each distinct path in the network is provided that includes at least one memory and at least one processor coupled to the at least one memory. At least one processor is configured to: determine a collection of hashes of a network based on a network probe event, each hash in the collection of hashes corresponding to a distinct path from a first edge device to a second edge device through the network; transmit a collection of probes from the first edge device in the network, wherein each probe in the collection of probes is assigned a hash selected from the collection of hashes; receive probes from the collection of probes at the second edge device; and analyze each probe received by the second edge device and determining a network performance of each distinct path through the network.

In another example, a non-transitory computer-readable medium is provided that has stored thereon instructions that, when executed by one or more processors, cause the one or more processors to: determine a collection of hashes of a network based on a network probe event, each hash in the collection of hashes corresponding to a distinct path from a first edge device to a second edge device through the network; transmit a collection of probes from the first edge device in the network, wherein each probe in the collection of probes is assigned a hash selected from the collection of hashes; receive probes from the collection of probes at the second edge device; and analyze each probe received by the second edge device and determining a network performance of each distinct path through the network.

In another example, an apparatus for monitoring each distinct path in the network is provided. The apparatus includes: means for determining a collection of hashes of a network based on a network probe event, each hash in the collection of hashes corresponding to a distinct path from a first edge device to a second edge device through the network; means for transmitting a collection of probes from the first edge device in the network, wherein each probe in the collection of probes is assigned a hash selected from the collection of hashes; means for receiving probes from the collection of probes at the second edge device; and means for analyzing each probe received by the second edge device and determining a network performance of each distinct path through the network.

In some aspects, a hash is included in a flow label field (or the least significant bits of the Source Address field) and a network path is determined based on a hash algorithm using the flow label field (or the least significant bits of the Source Address field) alone or combined with other fields from the packet header (e.g., Source Address, Destination Address, etc) and/or local variables (e.g., incoming interface identifier).

In some aspects, one or more of the methods, apparatuses, and computer-readable medium described above further comprise: generating a network performance report that identifies the network performance of each distinct path.

In some aspects, the network probe event comprises a scheduled network monitoring event that is executed on a fixed schedule or a routing protocol event that identifies a change in the network.

In some aspects, one or more of the methods, apparatuses, and computer-readable medium described above further comprise: sending discovery probes to identify each distinct path, wherein a quantity of the discovery probes is determined based on a number of distinct network paths in the network, and wherein each discovery probe comprises a random hash.

In some aspects, the quantity of distinct paths is determined based on $n\Sigma_{k=1}^{n}1/k$, where n is the number of of ECMP paths between any two endpoints.

In some aspects, one or more of the methods, apparatuses, and computer-readable medium described above further comprise: in response to a network change event, sending discovery probes to identify each distinct path and updating the collection of hashes.

In some aspects, the network change event comprises at least one of a scheduled network discovery event or an event associated with a routing protocol.

In some aspects, each intermediary node in the network adds information to the discovery probe that identifies a received interface and/or a transmission interface at the intermediary node.

In some aspects, a network monitoring device receives the discovery probes from the second edge device, groups the discovery probes based on a distinct path, and identifying a hash from each group of hashes, wherein each hash corresponds to each distinct path.

In one aspect, a first edge device is configured to assist a network monitoring system and includes a transceiver (e.g., a network interface, a wireless transceiver, etc.) and a processor coupled to the transceiver. The processor configured to execute instructions and cause the processor to: receive an instruction from a network controller to transmit a collection of hashes based on a network probe event, each hash in the collection of hashes corresponding to a distinct path from the first edge device to a second edge device through the network; transmit a collection of probes from the first edge device in the network, wherein each probe in the collection of probes is assigned a hash selected from the collection of hashes, wherein a second edge device receives the collection of probes and a network controller is configured to analyze each probe received by the second edge device and determine a network performance of each distinct path from the first edge device to the second edge device through the network, and receive probes transmitted from a third edge device and provide the each received probe to the network controller, wherein the network controller is configured to analyze each probe received by the first edge device and determine a network performance of each distinct path from the third edge device to the first edge device through the network.

Example Embodiments

Service Assurance for internet-based networking is a technology designed to provide assurance as a service for end customers of network services. In a nutshell, such a service assurance system leverages the programming capabilities of the network devices and a model/event-driven telemetry to deliver end-to-end service assurance. Network providers are increasingly required to provide an SLA that defines the level of service the customer expects from that network provider. The SLA identifies metrics by which service is measured, as well as remedies or penalties, should agreed-on service levels not be achieved.

FIG. 1 illustrates an example approach to monitoring network paths in an equal-cost multipath (ECMP) network. The network includes an ingress edge node 102 that is connected to different egress nodes 120, 122, 124, 126, 128, 130, and 132 through a plurality of ECMP network paths. As illustrated in FIG. 1, there are multiple paths, specifically seven that are emphasized, that can carry packets from edge node 102 to edge node 126. As the number of intermediary nodes increase, the number of potential paths increases and a hashing algorithm can be used to randomly select a path to balance network traffic. In some aspects, the hashing algorithm is used to make traffic-forwarding decisions for traffic exiting a switch when ECMP is enabled and determines how incoming traffic is forwarded to the next-hop device. The hashing algorithm makes hashing decisions based on values in various packet fields, as well as on the hash seed value.

In the case of FIG. 1, the hashing algorithms ensure that paths for the probes are randomly selected and analyzed by a path analyzer (not shown). Because the network path is randomly selected, the network probes are analyzed based on an average of all network paths in that network. The averaged network metrics can conceal issues such as particular segments (e.g., a particular link between an intermediary node 110 and 112) in the network that have a significant loss or high latency. For example, if the network connection between intermediary nodes 110 and 112 has a significant delay, that delay will be integrated into the averaged results.

The conventional approach requires many probes to be sent and the resulting metrics represents the aggregate performance of the network 100. The conventional approach cannot ensure that a network provider is satisfying an SLA that requires a minimum latency, jitter, across all network paths. The disclosed technology provides various aspects and techniques to improve network monitoring by using a discovery step to identify each distinct path through the ECMP network and controlling packet routes based on identifying routes that correspond to random hashes.

Using the identified routes, the disclosed technology can measure individual performance of network paths and determine network metrics of each distinct path. In some aspects, network metrics associated with a path can be used to identify network nodes and network links that are impairing network performance. A network provider can use these reports to identify and resolve network performance issues, and build reports that demonstrate that the network provider is satisfying the SLA. In addition, the disclosed technology can more frequently monitor the network performance based on reducing the number of network probes sent to monitor each path.

Figure 2:
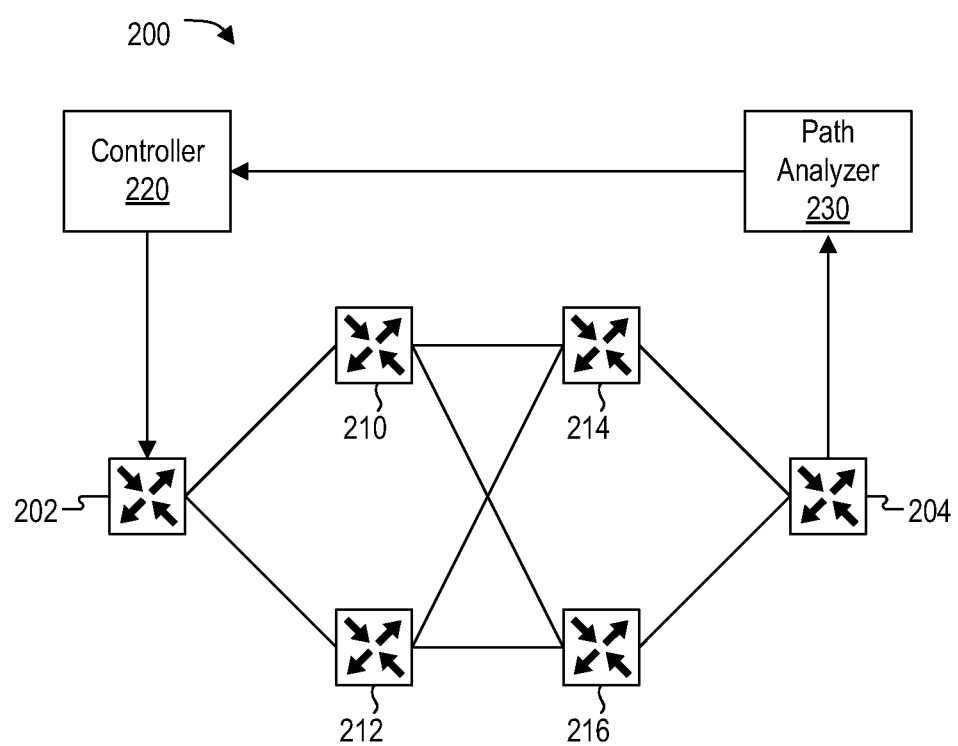
FIG. 2 illustrate a block diagram of a network including a path assurance monitoring for distinct network paths in accordance with some aspects of the disclosure.

FIG. 2 illustrates a block diagram of a network 200 including a path assurance monitoring for distinct network paths in accordance with some aspects of the disclosure. The network 200 includes in ingress node 202 and an egress node 204 for purposes of illustration. In some cases, the ingress node 202 can receive traffic from a network customer for routing to a destination such as egress node 204. The ingress node 202 may also receive traffic for providing to the network customer from another network or egress node 204.

In the illustrated example, the network 200 comprises four intermediary nodes, node 210, node 212, node 214, and node 216, which are ECMP paths between the ingress node 202 and the egress node 204. Based on the illustrated topology, four different paths that can be selected during transmission, and a controller 220 can initiate the ingress node 202 to perform a path discovery process using path tracing probes. For example, each path begins at ingress node 202 and ends at egress node 204, and paths include intermediary node pairs [210, 214], [210, 216], [212, 214], and [212, 216].

The controller 220 can be configured to receive interior gateway protocol (IGP) broadcasts that indicate that a new network device has been added into the network and the controller 220 can therefore determine a networking event has occurred and a path discovery process can be performed. Examples of a networking event includes a scheduled event that is executed on a periodic interval (e.g., an hour) or a detected change in a network. In the case of the networking event, the controller 220 can instruct the ingress node 202 to perform the path discovery process to identify at least one hash identifier that corresponds to each unique path in the network 200. Adding a new intermediary network node, or removing an intermediary network node can affect the hashing algorithm results of ingress node 202 and each of the intermediary nodes 210, 212, 214, and 216. For example, the ingress node can receive a message from a network routing protocol such as an interior gateway protocol (IGP) broadcast message from a new device.

The path discovery process is performed by the ingress node 202 at the hardware level and generates a number of path tracing probes for sending to the egress node 204. The ingress node may determine a number of potential paths between the ingress node 202 and the egress node and generate a number of path tracing probes that can statistically ensure that each distinct path is provided at least one path tracing probe. In one aspect, the number of probes is determined based on the coupon collector's problem, which determines, for a fixed number of equally random outcomes, the number of attempts that are necessary to ensure that, on average, each outcome is observed. The coupon collector's problem can be modeled as a sum of the outcomes in Equation 1 below, with n representing the number of outcomes.

$$\text{Number of Attempts} = n \sum_{k=1}^{n} \frac{1}{k} \quad \text{Equation 1}$$

For example, for 7 different possible paths illustrated in FIG. 1, the number of attempts necessary to randomly send a probe on each path is 18.15, which requires at least 19 probes. For 64 different ECMP paths, the number of attempts requires at least 304 different probes.

Each path tracing probe includes a randomly generated string, which is also referred to as a hash, that is inserted into the flow label field (or the least significant bits of the Source Address field) of an IPv6 packet and is sent to the egress node 204. In one illustrative example, the hash may be inserted into the least significant bits of the source address field of an IPv6 packet. For example, the source address field may be used to provide local encoding of functions in a segment routing (SR) network and intermediary network nodes can use the least significant bits for various purposes. The path tracing probe is randomly routed through the intermediary nodes based on the hash and the path tracing information is recorded into the probe. For example, the ingress node 204 will select a next hop (e.g., node 210 or node 212) based on the hash in the path tracing probe and record its path tracing information into the path tracing probe that the ingress node 204 sends the tracing probe on. Each intermediary node is configured to receive the path tracing probe, select a next hop based on the hash in the path tracing probe, and record its path tracing information.

Upon reception of the path tracing probes, the egress node 204 is configured to record path tracing information into the path tracing probes and forward the path tracing probes to the path analyzer 230. The path analyzer 230 groups each path tracing packet based on the path through the network 200. For example, in the case that 19 path tracing probes are sent based on 7 distinct network paths, the path analyzer creates 7 groups and the path tracing probes are inserted into their corresponding group. As described above, the number of path tracing probes is selected to statistically ensure that at least one path tracing probe is provided on each distinct network path. After grouping the path tracing probes, the path analyzer 230 selects a single hash identifier from each group to create a collection of hash identifiers, and each hash identifier corresponds to a path. For example, the path analyzer 230 generates a collection of hash identifiers and paths, which can be represented as a generic object as List<HashIdentifier, NetworkPath>. In some cases, the path analyzer 230 can select a random path tracing probe in the event multiple path tracing probes for a single path are received, or can identify a median path tracing probe.

In another illustrative aspect, the controller 220 is configured to provide an instruction for the ingress node 202 to perform a network monitoring process based on the collection of hashes identified during the path discovery process. The network monitoring process uses the collection of hashes to send path tracing probes or other packets to monitor each distinct path. Because each hash in the collection of hashes corresponds to a distinct path, the controller 220 can generate a packet with hashes selected from the collection of hashes, and send a number of packets corresponding to each distinct path to measure the network. As the path tracing probe travels through the network 200, each node will record its path tracing information in the path tracing probe packet and forward the packet to the next hop.

When the egress node 204 receives the path tracing packets, the path tracing packets are forwarded to a path analyzer 230. The path analyzer can perform the inspection of the packets based on the path tracing information and perform various calculations for each network path. Examples of network metrics include delay, packet loss, packet reordering, packet duplication, jitter, and so forth, and the network metrics can be further grouped by other extrinsic variables such as physical location, type of hardware, software version, and so forth. In some aspects, the ingress node 202 can use path tracing probes, but other types of packets can be used such as injected packets that have a destination address of the egress node 204, Internet control message protocol (ICMP) packets, and so forth.

In some aspects, the network nodes are configured to perform the described function in the hardware plane to efficiently ensure that a network can be accurately measured. The network nodes can inspect the header without performing a deep packet inspection based on the header structure and efficiently process the path tracing packets or other telemetry packets provided from the ingress node 202. By integrating the described functions into the hardware, the network monitoring process can be performed on a regular interval to measure the network performance of each network path and generate a more representative network performance report for customers.

Figure 3:
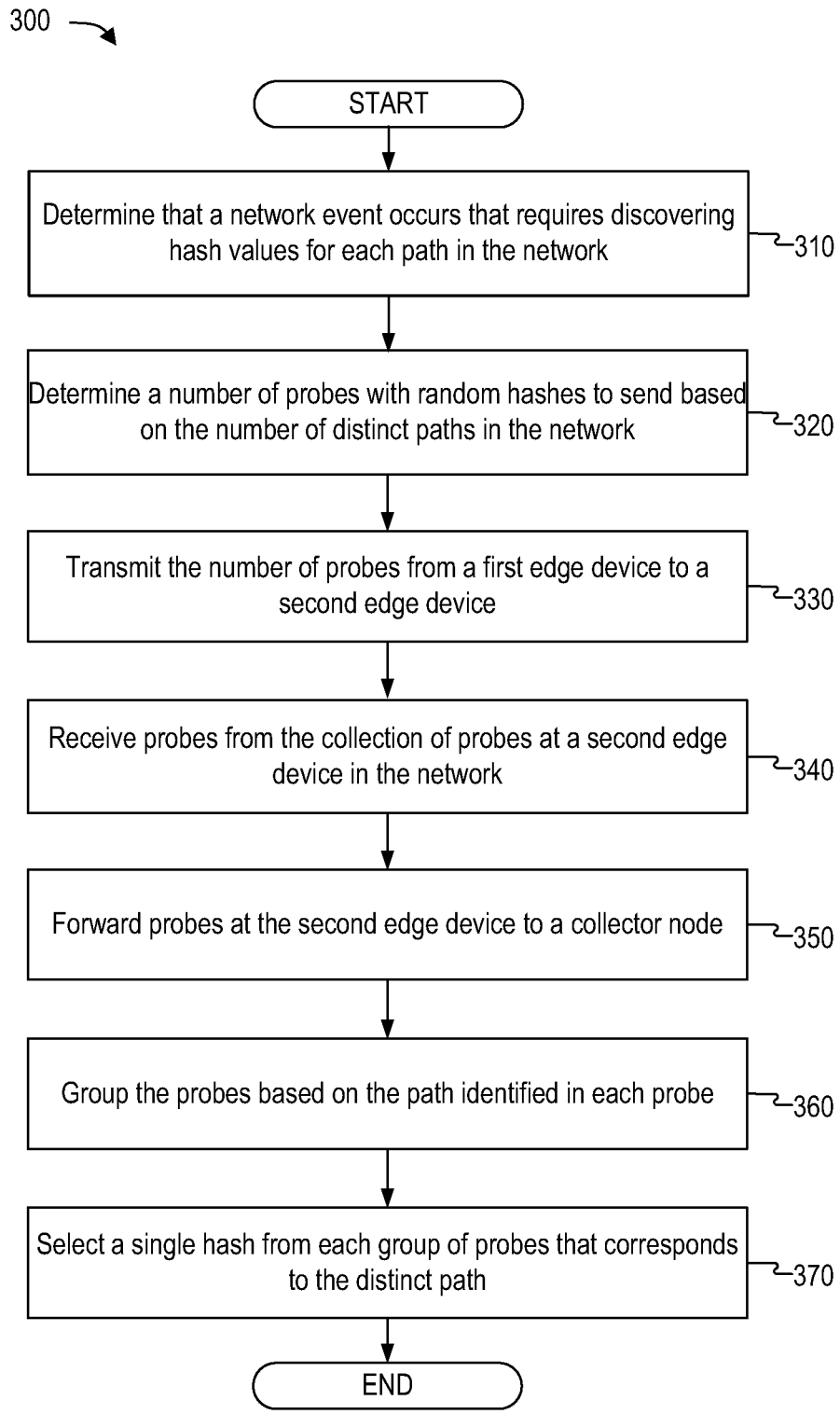
FIG. 3 illustrates an example method for discovering path identifiers that correspond to a distinct path in a network in accordance with some aspects.

FIG. 3 illustrates an example method for discovering path identifiers that correspond to a distinct path in a network in accordance with some aspects. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some aspects, the method may be executed using a plurality of network devices that configure a network. For example, a network provider can implement various edge devices, intermediary nodes, and other devices described herein with similar functionality.

According to some examples, at block 310, the method 300 begins with determining that a networking event occurs that prompts discovering hash values for each path in the network. For example, the ingress node 202 may detect a change in a routing protocol and determine that new network devices are added and routes may have changed. In another example, the controller 220 may instruct the ingress node 202 to be scheduled to instruct the ingress node 202 to perform the network discovery process. The controller 220 may be instructed to cause the ingress node 202 to perform the network discovery process on a fixed schedule (e.g., 15 minutes, 1 hour, etc.), in response to an event (e.g., an input, a network change, a network event or condition, a network statistic, a performance threshold, etc.) and/or on any other basis.

At block 320, the method 300 includes determining a number of probes with random hashes to send from a source device (e.g., edge device 202) to a destination device (e.g., edge device 204) based on the number of distinct paths in the network. The probes generated at block 320 will traverse the network paths based on an ECMP and a sufficient number of probes are generated to ensure that each distinct network path is traversed at least once. As noted above in Equation 1, the number of probes may be determined based on the coupon collector's problem that is rounded up to the nearest integer. For example, for 7 distinct paths, at least 19 probes should be transmitted to ensure that each distinct path is provided at least one probe on average. In another example, for 64 distinct paths, at least 304 probes should be transmitted to ensure that each distinct path is provided at least one probe on average. In some cases, the method 300 may also monitor bidirectional connections and may determine a number of problems to send from the edge device 204 to the edge device 202.

At block 330, the method 300 includes transmitting the determined number of probes from a first edge device (e.g., ingress node 202) to a second edge device (e.g., egress node 204). As described above, each probe is randomly routed through the network but at least one probe is provided on each distinct path.

At block 340, the method 300 includes configuring the second edge device (e.g., egress node 204) to receive the probes, with each probe being updated with path tracing information. For example, each probe includes a transmission interface of each hop (e.g., ingress node 202) and a reception interface of each hop (e.g., egress node 204). At block 350, the method 300 includes forwarding (e.g., by the second edge device) the probes to a collector node (e.g., the path analyzer 230). At block 360, the method 300 includes determining (e.g., by the collector node), for each probe, a path for that probe based on the path tracing information and then groups the probes based on the path. In some aspects, the collector node can determine whether the number of groups equals the number of distinct paths and perform corrective action if needed.

After grouping the probes, each group corresponds to each distinct path and any of the hashes in the flow label (or the least significant bits of the Source Address field) of the packets may be used to send a packet that will be selected to have a route corresponding to that packet. Accordingly, at block 370, the method 300 includes selecting a single hash from each group of probes that corresponds to the distinct path. In some examples, the single hash can form a collection (or a list) of hash identifiers that correspond to each distinct path.

Figure 4:
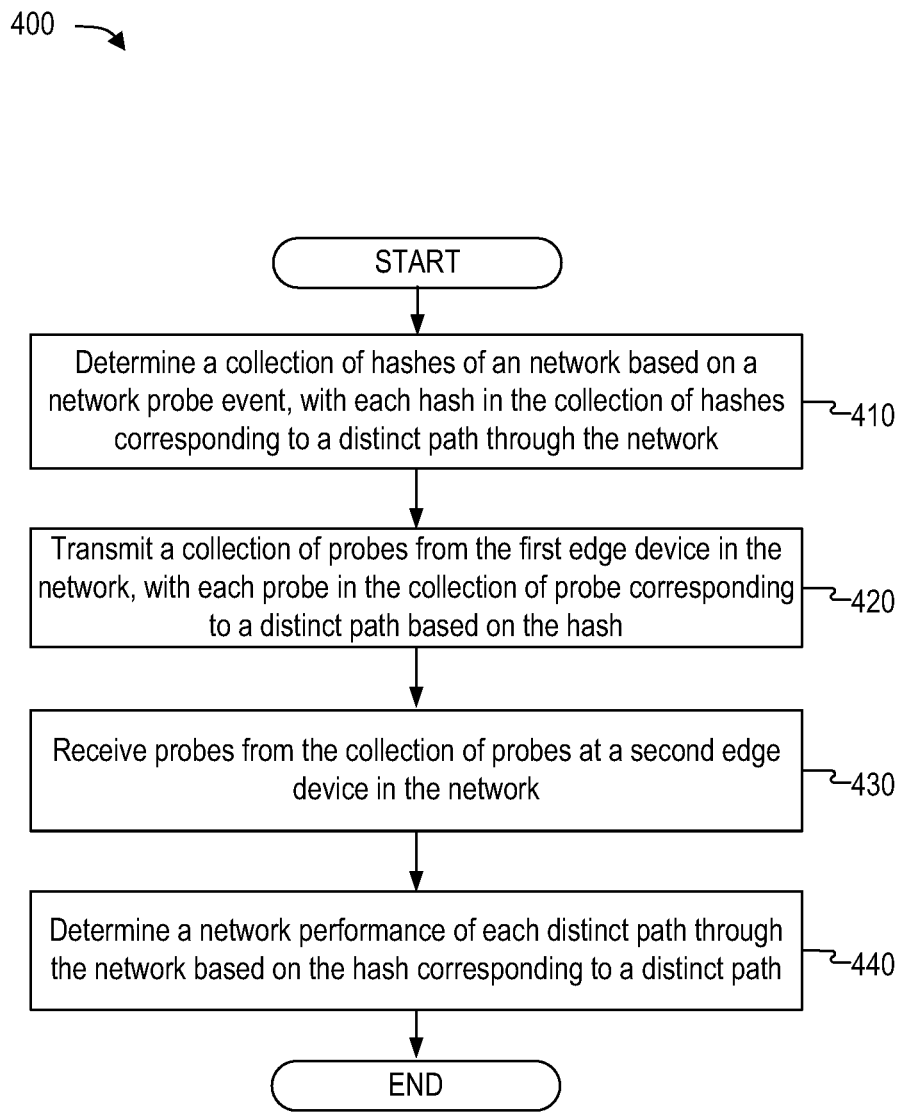
FIG. 4 illustrates an example method for performing a network monitoring process in accordance with some aspects.

FIG. 4 illustrates an example method 400 for performing a network monitoring process in accordance with some aspects. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some aspects, the method may be executed using a plurality of network devices that configure a network. For example, a network provider can implement various edge devices, intermediary nodes, and other devices described herein with similar functionality.

According to some examples, the method 400 includes determining a collection of hashes of a network based on a network probe event at block 410. For example, the controller 220 illustrated in FIG. 2 may determine that network probe event occurs and may instruct the ingress node 202 to perform a network discovery process. The event can include a scheduled network monitoring event that is executed on a fixed schedule, an IGP event that indicates that a new network node is added or a network node is removed, etc. Based on the network discovery process, the controller 220 may determine a collection of hashes of a network based on the network probe event, and each hash in the collection of hashes corresponds to a distinct path from a first edge device (e.g., ingress node 202) to a second edge device (e.g., egress node 204) through the network. As described above with reference to FIG. 2, a hash is included in a flow label field (or the least significant bits of the Source Address field) and a network path is determined based on a hash algorithm using the flow label field (or the least significant bits of the Source Address field) alone or combined with other fields from the packet header (e.g., Source Address, Destination Address, etc) and/or local variables (e.g., incoming interface identifier).

According to some examples, the method 400 includes transmitting a collection of probes from the first edge device in the network at block 420. For example, the ingress node 202 illustrated in FIG. 2 may transmit a collection of probes from the first edge device in the network to a second edge device. For example, a network provider may receive network data at a specific interface from a network backbone and may have an agreement to provide a SLA for a particular customer through an edge device. The network provider may need to monitor network connections from the network backbone to the edge device associated with that customer. Each probe in the collection of probes is assigned a distinct hash selected from the collection of hashes. As each distinct hash corresponds to a distinct path in the network, the number of probes can be equal to the number of distinct paths in the network. Previous network monitoring techniques required more probes based on a random path selection, and, in some cases, metrics that require multiple packets (e.g., packet loss) may not have been accurate because fewer packets (e.g., selection bias).

According to some examples, the method 400 includes receiving probes from the collection of probes at a second edge device at block 430. For example, the egress node 204 illustrated in FIG. 2 may receive probes from the collection of probes. The egress node 204 may forward the received packets associated with the collection of hashes to a network monitoring device such as the path analyzer 230. The path analyzer 230 may receive the probes from the second edge device and identify a hash corresponding to each distinct path.

According to some examples, the method 400 includes determining a network performance of each distinct path through the network at block 440. For example, the path analyzer 230 illustrated in FIG. 2 may determine a network performance of each distinct path through the network based on each hash in the path corresponding to a distinct path. For example, the network performance can identify path loss per path, latency per path, reordering per path, jitter per path, and so forth. The previous measurement techniques could only identify an aggregate measurement and hide negative characteristics of the measurement performance.

Figure 5:
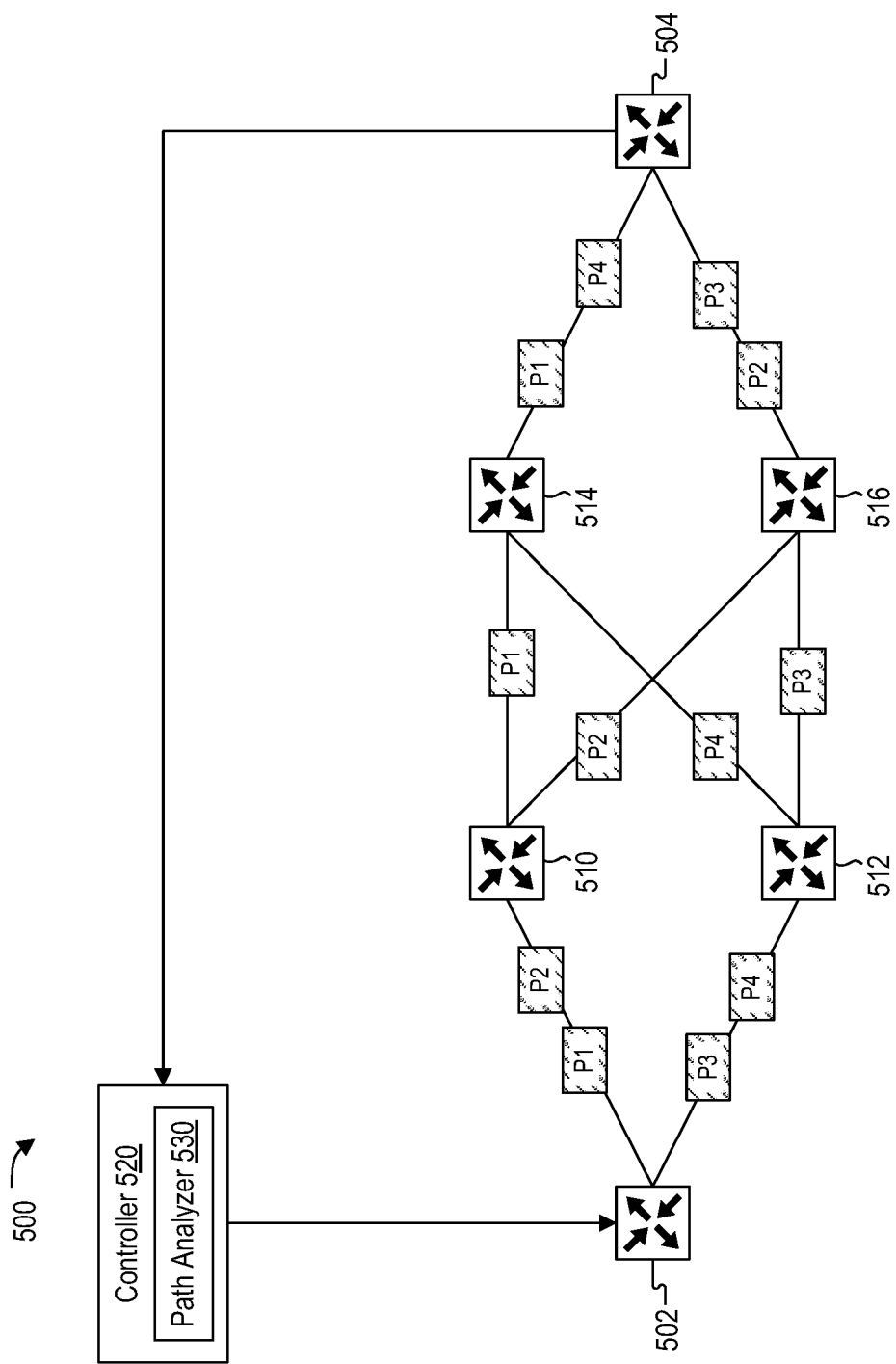
FIG. 5 illustrates a conception diagram that illustrates a path monitoring process based on hashes that correspond to distinct paths in accordance with some aspects.

FIG. 5 illustrates a conceptual diagram that illustrates a path monitoring process based on hashes that correspond to distinct paths in accordance with some aspects.

In some aspects, an example network 500 includes an ingress node 502 and an egress node 504, with intermediary nodes 510, 512, 514, and 516 between the ingress node 502 and egress node 504. In this network 500, there are four distinct paths and the network 500 includes a network controller 520 that includes a path analyzer 530. The network controller 520 may control various aspects of the network, such as triggering network discovery events, and the path analyzer 530 can identify distinct paths through the network.

In one illustrative example, the network controller 520 determines to monitor the packet for latency using a single packet for each network path. Accordingly, the ingress node 502 generates packet P1, packet P2, packet P3, and packet P4. The ingress node 502 selects packets P1 and P2 for sending to the intermediary node 510 and selects packets P3 and P4 for sending to the intermediary node 512. The intermediary node 510 determines to send packet P1 to intermediary node 514 and packet P2 to intermediary node 516. The intermediary node 512 determines to send packet P3 to intermediary node 514 and packet P4 to intermediary node 516. Intermediary node 514 determines that the next hop is the egress node 504 for both packets P1 and P4, and intermediary node 516 determines that the next hop is the egress node 504 for both packets P2 and P3.

The egress node 504 receives packets P1, P2, P3, and P4 and forwards the packets to the network controller 520 for analysis. For example, the network controller 520 can determine a latency of each packet. Other types of measurements, such as jitter and packet loss, may require additional packets.

The disclosed methods reduce the number of packets that are needed to monitor a network based on identification of hash identifiers corresponding to each path, and the probes can be handled within the hardware functionality of the device. As a result, metrics of each network path can be determined. In addition, the metrics can be executed on a schedule and time can be introduced as an additional dimension to analyze data. For example, the network monitoring process can be executed at a regular interval of 5 minutes, and a person or a device may generate a report that identified jitter changes throughout the day.

In addition, more accurate, per-route metrics can be determined to identify potential issues in the network. For example, if a network has 64 potential distinct paths and a single path has an invalid connection, that connection may indicate 100% path loss. In an averaging metrics, the invalid connection may not be detected based on aggregation of all issues.

Figure 6:
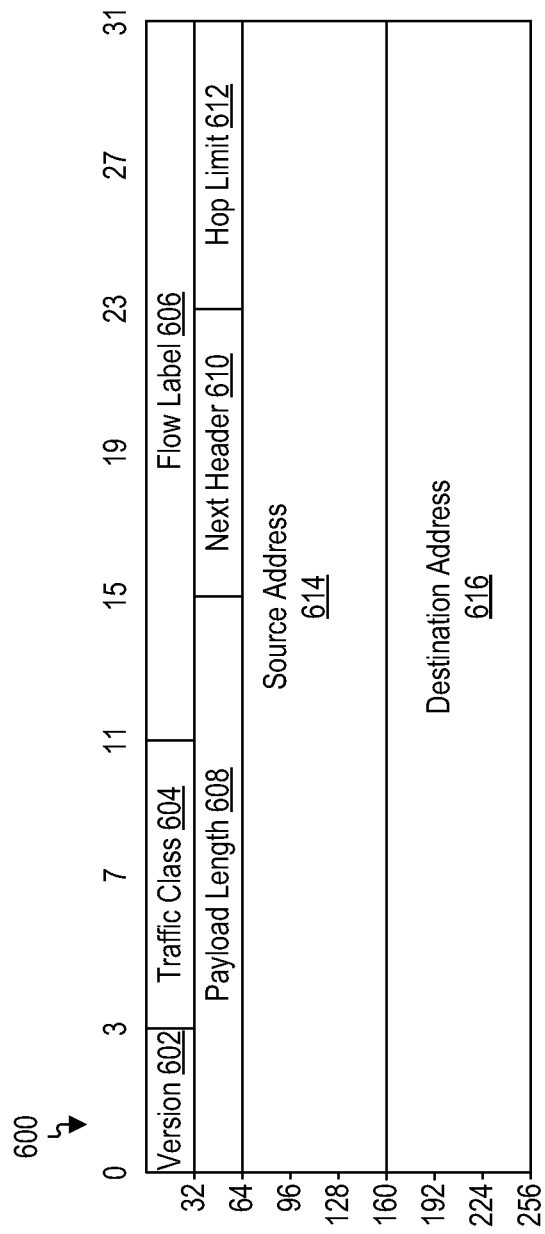
FIG. 6 illustrates an example internet protocol (IP) header that includes local processing metadata according to an example of the instant disclosure.

FIG. 6 illustrates an IPv6 header that can be used for a path tracing probe according to an example of the instant disclosure.

The IPv6 header includes a version 602, a traffic class 604, a flow label 606, a payload length 608, a next header 610, a hop limit 612, a source address 614, and a destination address 616. In some examples, local processing metadata can be encoded or provided into the least significant bits of the source address 614 in an SR network.

The version 602 is 4-bits and represents the version of IP packet (e.g., 0110 for IPv6). The traffic class 604 is 8-bits and includes two potions: the most significant 6 bits are used for a type of service to identify services that should be provided to this packet and the least significant 2 bits are used for explicit congestion notification (ECN). The flow label 606 is 20-bits and is used to maintain the sequential flow of the packets belonging to a communication. The source labels the sequence to help the router identify that a particular packet belongs to a specific flow of information.

The payload length 608 is 16-bits and is used to tell the routers how much information a particular packet contains in its payload. The payload can be composed of extension headers and upper layer data. with 16 bits, up to 65535 bytes can be indicated; but if the extension headers contain a hop-by-hop extension header, then the payload may exceed 65535 bytes and this field is set to 0. The next header is 8-bits and is used to indicate either the type of extension header, or if the extension header is not present then it indicates the upper layer protocol data unit (PDU). The hop limit 612 is 8-bits and is used to stop packets from being configured in an infinite loop. The value of hop limit 612 is decremented by 1 as it passes a link (router/hop) and the packet is discarded when the hop limit 612 reaches 0.

The source address 614 is 128 bits and is used to identify the address of the originator of the packet. In some aspects, the least significant bits of the source address field 614 can be used to encode the hash value instead of the flow label field 606. The destination address 616 is 128 bits and is used to identify the address of the intended recipient of the packet. In some aspects, the flow label 606 (or the least significant bits of the Source Address 614) is configured to include a random hash that is used for load balancing and routing functions. For example, as described above, a network node can select a next hop in the network based on the value of the random hash in the flow label 606 (or the least significant bits of the Source Address 614) alone or combined with other fields from the packet header (e.g., Source Address, Destination Address, etc) and/or local variables (e.g., incoming interface identifier).

Figure 7:
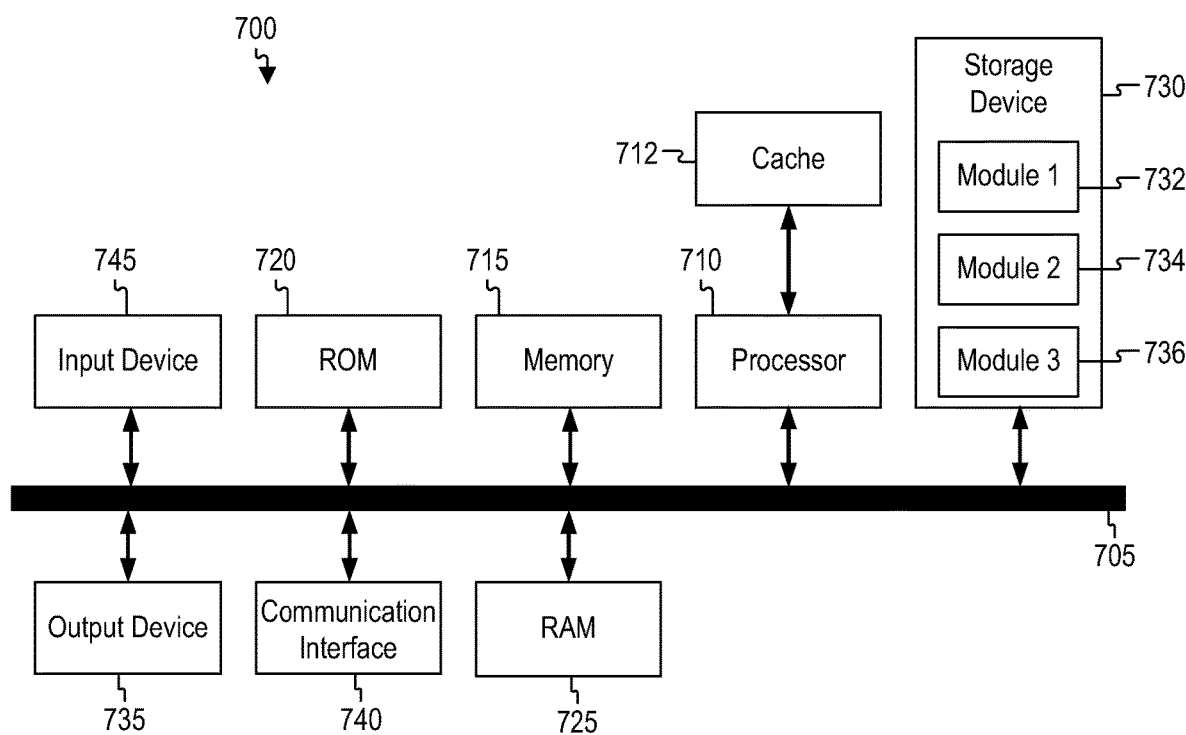
FIG. 7 shows an example of a computing system, which can be for example any computing device that can implement components of the system.

FIG. 7 shows an example of computing system 700, which can be for example any computing device making up any network node such as the controller 220, the various network nodes (e.g, network nodes 202, 204, 210, 212, 214, and 216), and path analyzer 230, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, RAMs, ROMs, and/or some combination of these devices.

The storage device 730 can include software services, servers, services, etc., that, when the code that defines such software is executed by the processor 710, causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 8:
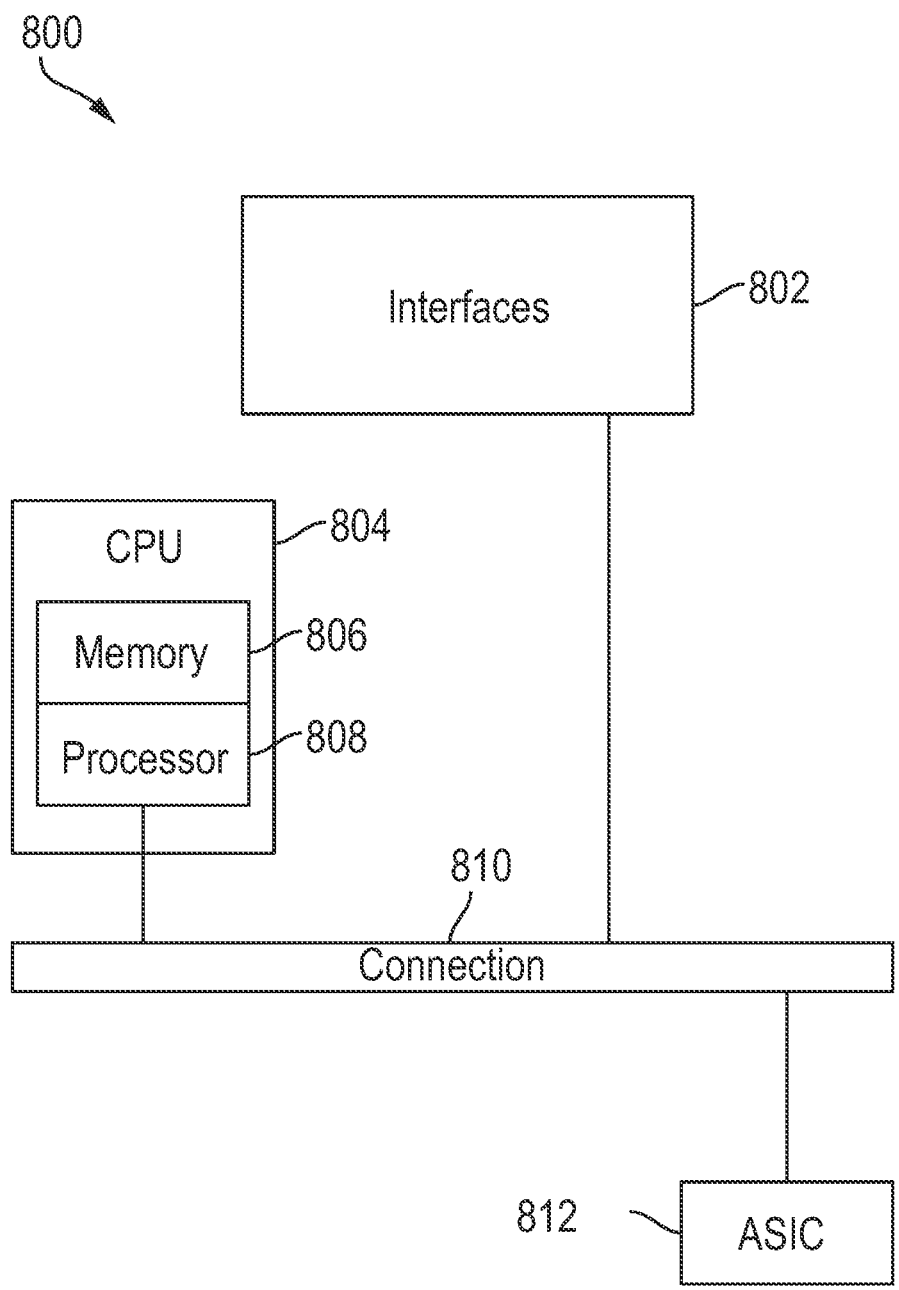
FIG. 8 illustrates an example network device in accordance with some examples of the disclosure.

FIG. 8 illustrates an example network device 800 suitable for performing switching, routing, load balancing, and other networking operations. The example network device 800 can be implemented as switches, routers, nodes, metadata servers, load balancers, client devices, and so forth.

Network device 800 includes a central processing unit (CPU) 804, interfaces 802, and a bus 810 (e.g., a peripheral component interconnect (PCI) bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, digital subscriber line (DSL) interfaces, token ring interfaces, and the like. In addition, various very high-speed interfaces may be provided such as fast token ring interfaces, wireless interfaces, Ethernet interfaces, Gigabit Ethernet interfaces, asynchronous transfer mode (ATM) interfaces, high-speed serial interfaces (HSSI), point-of-sale (POS) interfaces, fiber distributed data interface (FDDI), WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 804) to efficiently perform routing computations, network diagnostics, security functions, etc.

Although the system shown in FIG. 8 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application specific integrated circuit (ASIC) 812, which can be configured to perform routing and/or switching operations. The ASIC 812 can communicate with other components in the network device 800 via the bus 810, to exchange data and signals and coordinate various types of operations by the network device 800, such as routing, switching, and/or data storage operations, for example.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1: A method for measuring performance of distinct paths of a network, comprising: determining a collection of hashes of a network based on a network probe event, each hash in the collection of hashes corresponding to a distinct path from a first edge device to a second edge device through the network; transmitting a collection of probes from the first edge device in the network, wherein each probe in the collection of probes is assigned a hash selected from the collection of hashes; receiving probes from the collection of probes at the second edge device; and analyzing each probe received by the second edge device and determining a network performance of each distinct path through the network.

Aspect 2: The method of Aspect 1, wherein a hash is included in a flow label field (or the least significant bits of the Source Address field) and a network path is determined based on a hash algorithm using the flow label field (or the least significant bits of the Source Address field) alone or combined with other fields from the packet header (e.g., Source Address, Destination Address, etc) and/or local variables (e.g., incoming interface identifier).

Aspect 3: The method of any of Aspects 1 to 2, further comprising generating a network performance report that identifies the network performance of each distinct path.

Aspect 4: The method of any of Aspects 1 to 3, wherein the network probe event comprises a scheduled network monitoring event that is executed on a fixed schedule or a routing protocol event that identifies a change in the network.

Aspect 5: The method of any of Aspects 1 to 4, wherein the determining the collection of hashes comprises: sending discovery probes to identify each distinct path, wherein a quantity of the discovery probes is determined based on a number of distinct network paths in the network, and wherein each discovery probe comprises a random hash.

Aspect 6: The method of any of Aspects 1 to 5, wherein the quantity of distinct paths is determined based on $$n \sum_{k=1}^{n} \frac{1}{k},$$

where n is the number of distinct paths.

Aspect 7: The method of any of Aspects 1 to 6, further comprising: in response to a network change event, sending discovery probes to identify each distinct path and updating the collection of hashes.

Aspect 8: The method of any of Aspects 1 to 7, wherein the network change event comprises at least one of a scheduled network discovery event or an event associated with a routing protocol.

Aspect 9: The method of any of Aspects 1 to 8, wherein each intermediary node in the network adds information to the discovery probe that identifies a received interface and/or a transmission interface at the intermediary node.

Aspect 10: The method of any of Aspects 1 to 9, wherein a network monitoring device receives the discovery probes from the second edge device, groups the discovery probes based on a distinct path, and identifies a hash from each group of hashes, wherein each hash corresponds to each distinct path.

Aspect 11: A network device for monitoring distinct network paths includes a transceiver (e.g., a network interface, a wireless transceiver, etc.) and a processor coupled to the transceiver. The processor configured to execute instructions and cause the processor to: determine a collection of hashes of a network based on a network probe event, each hash in the collection of hashes corresponding to a distinct path from a first edge device to a second edge device through the network; induce an edge device transmit a collection of probes from the first edge device in the network, wherein each probe in the collection of probes is assigned a hash selected from the collection of hashes; induce another edge device to receive probes from the collection of probes at the second edge device; and analyze each probe received by the second edge device and determine a network performance of each distinct path through the network.

Aspect 12: The network device of Aspect 11, wherein a hash is included in a flow label field (or the least significant bits of the Source Address field) and a network path is determined based on a hash algorithm using the flow label field (or the least significant bits of the Source Address field) alone or combined with other fields from the packet header (e.g., Source Address, Destination Address, etc) and/or local variables (e.g., incoming interface identifier).

Aspect 13: The network device of any of Aspects 11 to 12, wherein the processor is configured to execute the instructions and cause the processor to: generate a network performance report that identifies the network performance of each distinct path.

Aspect 14: The network device of any of Aspects 11 to 13, wherein the network probe event comprises a scheduled network monitoring event that is executed on a fixed schedule or a routing protocol event that identifies a change in the network.

Aspect 15: The network device of any of Aspects 11 to 14, wherein the processor is configured to execute the instructions and cause the processor to: send discovery probes to identify each distinct path, wherein a quantity of the discovery probes is determined based on a number of distinct network paths in the network, and wherein each discovery probe comprises a random hash.

Aspect 16: The network device of any of Aspects 11 to 15, wherein the quantity of distinct paths is determined based on $$n \sum_{k=1}^{n} \frac{1}{k},$$

where n is the number of distinct paths.

Aspect 17: The network device of any of Aspects 11 to 16, wherein the processor is configured to execute the instructions and cause the processor to: in response to a network change event, send discovery probes to identify each distinct path and updating the collection of hashes.

Aspect 18: The network device of any of Aspects 11 to 17, wherein the network change event comprises at least one of a scheduled network discovery event or an event associated with a routing protocol.

Aspect 19: The network device of any of Aspects 11 to 18, wherein each intermediary node in the network adds information to the discovery probe that identifies a received interface and/or a transmission interface at the intermediary node.

Aspect 20: The network device of any of Aspects 11 to 19, wherein a network monitoring device receives the discovery probes from the second edge device, groups the discovery probes based on a distinct path, and identify a hash from each group of hashes, wherein each hash corresponds to each distinct path.

Aspect 21: A computer readable medium comprising instructions using a computer system. The computer includes a memory (e.g., implemented in circuitry) and a processor (or multiple processors) coupled to the memory.

The processor (or processors) is configured to execute the computer readable medium and cause the processor to: determine a collection of hashes of a network based on a network probe event, each hash in the collection of hashes corresponding to a distinct path from a first edge device to a second edge device through the network; transmit a collection of probes from the first edge device in the network, wherein each probe in the collection of probes is assigned a hash selected from the collection of hashes; receive probes from the collection of probes at the second edge device; and analyze each probe received by the second edge device and determining a network performance of each distinct path through the network.

Aspect 22: The computer readable medium of Aspect 21, wherein a hash is included in a flow label field (or the least significant bits of the Source Address field) and a network path is determined based on a hash algorithm using the flow label field (or the least significant bits of the Source Address field) alone or combined with other fields from the packet header (e.g., Source Address, Destination Address, etc) and/or local variables (e.g., incoming interface identifier).

Aspect 23: The computer readable medium of any of Aspects 21 to 22, wherein the processor is configured to execute the computer readable medium and cause the processor to: generate a network performance report that identifies the network performance of each distinct path.

Aspect 24: The computer readable medium of any of Aspects 21 to 23, wherein the network probe event comprises a scheduled network monitoring event that is executed on a fixed schedule or a routing protocol event that identifies a change in the network.

Aspect 25: The computer readable medium of any of Aspects 21 to 24, wherein the processor is configured to execute the computer readable medium and cause the processor to: send discovery probes to identify each distinct path, wherein a quantity of the discovery probes is determined based on a number of distinct network paths in the network, and wherein each discovery probe comprises a random hash.

Aspect 26: The computer readable medium of any of Aspects 21 to 25, wherein the quantity of distinct paths is determined based on $$n \sum_{k=1}^{n} \frac{1}{k},$$

where n is the number of distinct paths.

Aspect 27: The computer readable medium of any of Aspects 21 to 26, wherein the processor is configured to execute the computer readable medium and cause the processor to: in response to a network change event, send discovery probes to identify each distinct path and updating the collection of hashes.

Aspect 28: The computer readable medium of any of Aspects 21 to 27, wherein the network change event comprises at least one of a scheduled network discovery event or an event associated with a routing protocol.

Aspect 29: The computer readable medium of any of Aspects 21 to 28, wherein each intermediary node in the network adds information to the discovery probe that identifies a received interface and/or a transmission interface at the intermediary node.

Aspect 30: The computer readable medium of any of Aspects 21 to 29, wherein a network monitoring device receives the discovery probes from the second edge device, groups the discovery probes based on a distinct path, and identify a hash from each group of hashes, wherein each hash corresponds to each distinct path.

Aspect 31: A first edge device to assist a network monitoring system includes a transceiver (e.g., a network interface, a wireless transceiver, etc.) and a processor coupled to the transceiver. The processor configured to execute instructions and cause the processor to: receive an instruction from a network controller to transmit a collection of hashes based on a network probe event, each hash in the collection of hashes corresponding to a distinct path from the first edge device to a second edge device through the network; transmit a collection of probes from the first edge device in the network, wherein each probe in the collection of probes is assigned a hash selected from the collection of hashes, wherein a second edge device receives the collection of probes and a network controller is configured to analyze each probe received by the second edge device and determine a network performance of each distinct path from the first edge device to the second edge device through the network, and receive probes transmitted from a third edge device and provide the each received probe to the network controller, wherein the network controller is configured to analyze each probe received by the first edge device and determine a network performance of each distinct path from the third edge device to the first edge device through the network.

What is claimed is:

1. A method for measuring performance of distinct paths of a network, comprising:
    determining a collection of hashes of a network based on a network probe event, each hash in the collection of hashes corresponding to a distinct path from a first edge device to a second edge device through the network;
    transmitting a collection of probes from the first edge device in the network, wherein each probe in the collection of probes is randomly assigned a hash selected from the collection of hashes and each probe is routed through the network accordingly to the randomly assigned hash and information recorded in the respective probe;
    receiving probes from the collection of probes at the second edge device;
    analyzing each probe received by the second edge device and determining a network performance of each distinct path through the network; and
    in response to a network change event, sending discovery probes to identify each distinct path and updating the collection of hashes,
    wherein the discovery probes are grouped based on a distinct path, each group is identified by a respective hash, each respective hash corresponds to a respective distinct path.

2. The method of claim 1, wherein a hash is included in a flow label field or least significant bits of a source address field and a network path is determined based on a hash algorithm using the flow label field or the least significant bits of the Source Address field.

3. The method of claim 1, further comprising generating a network performance report that identifies the network performance of each distinct path.

4. The method of claim 1, wherein the network probe event comprises a scheduled network monitoring event that is executed on a fixed schedule or a routing protocol event that identifies a change in the network.

5. The method of claim 1, wherein the determining the collection of hashes comprises:

sending discovery probes to identify each distinct path, wherein a quantity of the discovery probes is determined based on a number of distinct network paths in the network, and wherein each discovery probe comprises a random hash.

6. The method of claim 5, wherein the quantity of distinct paths is determined based on $$n\sum\nolimits_{k=1}^{n}\frac{1}{k},$$

where n is the number of distinct paths.

7. The method of claim 1, wherein the network change event comprises at least one of a scheduled network discovery event or an event associated with a routing protocol.

8. The method of claim 1, wherein the network includes a plurality of intermediary nodes and each intermediary node in the network adds information to the discovery probe that identifies a received interface and/or a transmission interface at the intermediary node.

9. A network system for monitoring distinct network paths, comprising:
a transceiver; and
a processor configured to execute instructions and cause the processor to:
determine a collection of hashes of a network based on a network probe event, each hash in the collection of hashes corresponding to a distinct path from a first edge device to a second edge device through the network;
induce an edge device to transmit a collection of probes from the first edge device in the network, wherein each probe in the collection of probes is randomly assigned a hash selected from the collection of hashes and each probe is routed through the network accordingly to the randomly assigned hash and information recorded in the respective probe;
induce another edge device to receive probes from the collection of probes at the second edge device;
analyze each probe received by the second edge device and determine a network performance of each distinct path through the network; and
in response to a network change event, send discovery probes to identify each distinct path and updating the collection of hashes,
wherein the discovery probes are grouped based on a distinct path, each group is identified by a respective hash, each respective hash corresponds to a respective distinct path.

10. The network system of claim 9, wherein a hash is included in a flow label field or least significant bits of a source address field and a network path is determined based on a hash algorithm using the flow label field or the least significant bits of the Source Address field.

11. The network system of claim 9, wherein the instructions further cause the processor to: generate a network performance report that identifies the network performance of each distinct path.

12. The network system of claim 9, the network probe event comprises a scheduled network monitoring event that is executed on a fixed schedule or a routing protocol event that identifies a change in the network.

13. The network system of claim 9, wherein the instructions further cause the processor to:
induce the edge device to send discovery probes to identify each distinct path, wherein a quantity of the discovery probes is determined based on a number of distinct network paths in the network, and wherein each discovery probe comprises a random hash.

14. The network system of claim 13, the quantity of distinct paths is determined based on $$n\sum\nolimits_{k=1}^{n}\frac{1}{k},$$

where n is the number of distinct paths.

15. The network system of claim 9, the network change event comprises at least one of a scheduled network discovery event or an event associated with a routing protocol.

16. The network system of claim 9, the network includes a plurality of intermediary nodes and each intermediary node in the network adds information to the discovery probe that identifies a received interface and/or a transmission interface at the intermediary node.

17. A non-transitory computer readable medium comprising instructions, the instructions, when executed by a computing system, cause the computing system to:
determine a collection of hashes of a network based on a network probe event, each hash in the collection of hashes corresponding to a distinct path from a first edge device to a second edge device through the network;
induce an edge device to transmit a collection of probes from the first edge device in the network, wherein each probe in the collection of probes is randomly assigned a hash selected from the collection of hashes and each probe is routed through the network accordingly to the randomly assigned hash and information recorded in the respective probe;
induce another edge device to receive probes from the collection of probes at the second edge device;
analyze each probe received by the second edge device and determine a network performance of each distinct path through the network; and
in response to a network change event, send discovery probes to identify each distinct path and updating the collection of hashes,
wherein the discovery probes are grouped based on a distinct path, each group is identified by a respective hash, each respective hash corresponds to a respective distinct path.

18. The non-transitory computer readable medium of claim 17, wherein a hash is included in a flow label field or least significant bits of a source address field and a network path is determined based on a hash algorithm using the flow label field or the least significant bits of the Source Address field.

19. The non-transitory computer readable medium of claim 17, wherein the instructions further cause the computing system to: generate a network performance report that identifies the network performance of each distinct path.

20. The non-transitory computer readable medium of claim 17, wherein the network probe event comprises a scheduled network monitoring event that is executed on a fixed schedule or a routing protocol event that identifies a change in the network.

* * * * *